United States Patent
Goto et al.

(10) Patent No.: US 6,838,176 B2
(45) Date of Patent: Jan. 4, 2005

(54) EPOXY RESIN COMPOSITION AND PREPREG MADE WITH THE EPOXY RESIN COMPOSITION

(75) Inventors: Kazuya Goto, Nagoya (JP); Shigetsugu Hayashi, Nagoya (JP); Tadayoshi Saito, Nagoya (JP); Takashi Kaneko, Nagoya (JP); Kazutami Mitani, Nagoya (JP); Koki Wakabayashi, Nagoya (JP); Yasuo Takagi, Nagoya (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/257,403

(22) PCT Filed: Apr. 20, 2001

(86) PCT No.: PCT/JP01/03410

§ 371 (c)(1),
(2), (4) Date: Oct. 21, 2002

(87) PCT Pub. No.: WO01/81445

PCT Pub. Date: Nov. 1, 2001

(65) Prior Publication Data

US 2003/0135011 A1 Jul. 17, 2003

(30) Foreign Application Priority Data

Apr. 21, 2000 (JP) ........................................ 2000-121163
Jan. 17, 2001 (JP) ........................................ 2001-009389

(51) Int. Cl.[7] .................. B32B 27/38; B32B 27/04; C08L 63/00; C08L 63/04
(52) U.S. Cl. .................... 428/413; 428/297.4; 428/375; 428/396; 523/400; 528/87; 528/88; 528/119; 528/120; 528/121; 528/122
(58) Field of Search ................................ 428/413, 415, 428/416, 417, 418, 375, 297.7, 299.4, 396, 297.4; 523/400; 528/87, 93, 94, 88, 119, 120, 121, 122

(56) References Cited

U.S. PATENT DOCUMENTS

| 5,179,139 A | | 1/1993 | Sugimori et al. |
| 5,350,826 A | * | 9/1994 | Watanabe et al. .............. 528/93 |
| 5,357,008 A | * | 10/1994 | Tsai et al. .................... 525/526 |

FOREIGN PATENT DOCUMENTS

| EP | 590975 | 4/1994 |
| JP | 6-16838 | 1/1994 |
| JP | 7-2975 | 1/1995 |
| JP | 7-70406 | 3/1995 |
| JP | 7-70410 | 3/1995 |
| JP | 8-208812 | 8/1996 |
| JP | 8-225667 | 9/1996 |
| JP | 10-36532 | 2/1998 |
| JP | 10-45925 | 2/1998 |
| JP | 10-292031 | 11/1998 |
| JP | 11-246741 | 9/1999 |
| JP | 11-279261 | 10/1999 |

OTHER PUBLICATIONS

Machine Translation of JP 10–045925, provided by the JPO website.*
Patent Abstracts of Japan, JP 58–168620, Oct. 5, 1983.
Derwent Abstract, XP–002243407, JP 06–157876, Jun. 7, 1994.

* cited by examiner

Primary Examiner—Randy Gulakowski
Assistant Examiner—Michael J. Feely
(74) Attorney, Agent, or Firm—Oblon, Spivak, McClelland, Maier & Neustadt, P.C.

(57) ABSTRACT

Epoxy resin compositions comprising (a) an epoxy resin, (b) a latent curing agent with curing power at 100° C. or below and (c) an aromatic amine-based curing agent and/or an alicyclic amine-based curing agent, which are curable in two stages, or epoxy resin compositions further comprising (d) a curing accelerator, as well as a prepregs comprising reinforcing fiber materials impregnated with the epoxy resin compositions. The compositions give die-releasable cured products by primary curing at low temperature, give highly heat-resistant cured products by secondary curing, and exhibit satisfactory stability at room temperature.

14 Claims, 1 Drawing Sheet

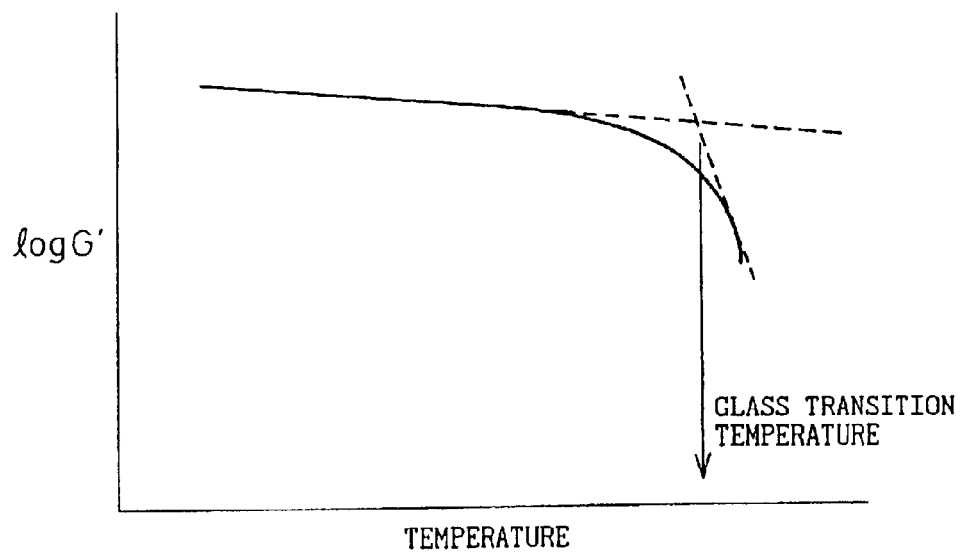

EPOXY RESIN COMPOSITION AND PREPREG MADE WITH THE EPOXY RESIN COMPOSITION

TECHNICAL FIELD

The present invention relates to an epoxy resin composition which is suitable for application as a matrix resin for fiber-reinforced composite materials, and to a prepreg employing it.

BACKGROUND ART

Fiber-reinforced composite materials are utilized in a wide range of applications, from sports and leisure-related purposes to transportation purposes such as in aircraft, and for industrial applications. Molding methods using dies are the most common molding methods for such fiber-reinforced composite materials.

Examples of such methods include the hand layup method wherein a reinforcing fiber material such as a cloth is impregnated with a resin while being laid up along a die, or a "prepreg" of a reinforcing fiber material pre-impregnated with a resin is laid up along a die, and after repeating this process, is cured and released from the die to obtain a molded article; the resin transfer molding method wherein a reinforcing fiber material such as a cloth is set in a die, injected with a resin and cured and then released from the die to obtain a molded article; and the molding compound method wherein a reinforcing fiber material cut into staple fibers is mixed with a resin to prepare a molding material which is injected into a die and then cured and released from the die to obtain a molded article.

The dies used for such molding methods are made of various materials such as metal, resin or wood. Metal dies exhibit excellent heat resistance and durability but are costly because of the effort and labor required for manufacture, while resin dies and wooden dies have the advantage of cheaper availability despite inferior heat resistance and durability.

In order to meet the increasing requirements of recent years, it has been common to employ cheaply available resin dies for the increased production of various types of molded articles on a small scale, while wooden dies are sometimes used for molding of large-size fiber-reinforced composite materials for marine shipping and the like.

Molding methods employing such resin dies or wooden dies do not permit molding at high temperature because of the inadequate heat resistance of the resin or wooden dies themselves, and therefore cannot be applied for molding of articles with high heat resistance.

As a method for obtaining molded articles made of fiber-reinforced composite materials with high heat resistance using low-heat-resistant resin or wooden molding dies, there has been proposed a method wherein a low-heat-resistant molding die is utilized for primary curing at a relatively low temperature of 100° C. or below to prepare a releasable primary cured molded article, after which the primary cured molded article is released from the low-heat-resistant molding die and subsequently allowed to stand in a high-temperature atmosphere for secondary curing, and this method has been attempted for molding of large-sized molded articles that require high heat resistance, such as articles destined for the shipping and aerospace industry.

Incidentally, when such molding methods employing curing means comprising both primary curing and secondary curing are carried out using prepregs; it is essential for the prepreg to be cured for a short time at a relatively low temperature of 100° C. or below to achieve releasable curing, to obtain a cured product with high heat resistance by secondary curing at high temperature, and to ensure that the prepreg itself has excellent stability and satisfactory handleability at room temperature.

In light of these circumstances, numerous technical documents such as Japanese Unexamined Patent Publication HEI No. 11-302412, for example, have disclosed resin compositions that are relatively stable at room temperature and curable at comparatively low temperatures of 70–100° C., and although these resin compositions are all curable at low temperature and give primary cured products with excellent mechanical properties, they do not exhibit adequate heat resistance even during the subsequent secondary curing at high temperature.

On the other hand, conventional resin compositions which give cured products with satisfactory heat resistance have also been problematic in that a long time is required for releasable primary curing at relatively low temperatures of 100° C. and below.

DISCLOSURE OF THE INVENTION

It is an object of the invention is therefore to provide epoxy resin compositions that do not require a long time to obtain releasable cured products by primary curing at a relatively low temperature of 100° C. or below, while giving cured products with high heat resistance by secondary curing, the epoxy resin compositions also possessing properties such as satisfactory stability at room temperature and satisfactory handleability of their prepregs obtained by impregnating them into reinforcing fiber materials, as well as to provide prepregs comprising reinforcing fiber materials impregnated with the epoxy resin compositions.

This object can be achieved by epoxy resin compositions of the invention having the constitution described below.

Specifically, an epoxy resin composition according to the invention is an epoxy resin composition, comprising the following components (a), (b) and (c), which is curable in two stages.

(a): An epoxy resin.

(b): A latent curing agent with curing power at 100° C. or below.

(c): An aromatic amine-based curing agent and/or an alicyclic amine-based curing agent.

In the epoxy resin composition of the invention having the aforementioned constitution, the mixing proportion of component (a), component (b) and component (c) is preferably 3–40 parts by weight of component (b) and 10–40 parts by weight of component (c) to 100 parts by weight of component (a).

The epoxy resin as component (a) is preferably an epoxy resin composed mainly of a trifunctional or greater functional epoxy resin, and the trifunctional or greater functional epoxy resin is preferably an epoxy resin containing at least one selected from novolac-type epoxy resins represented by chemical formula (1) below, novolac-type epoxy resins represented by chemical formula (2) below, and tetraglycidyldiaminodiphenylmethane.

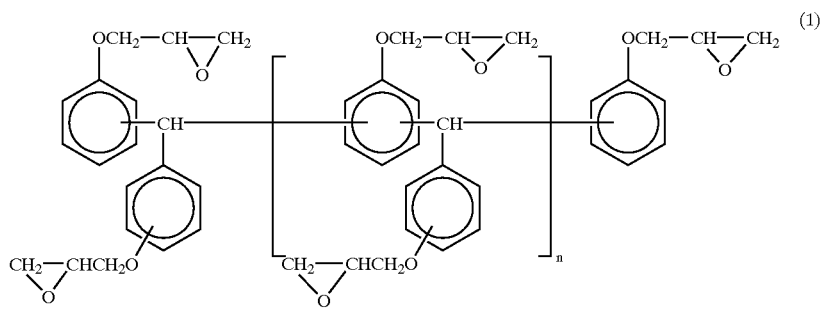

wherein n represents a number of 0 or greater,

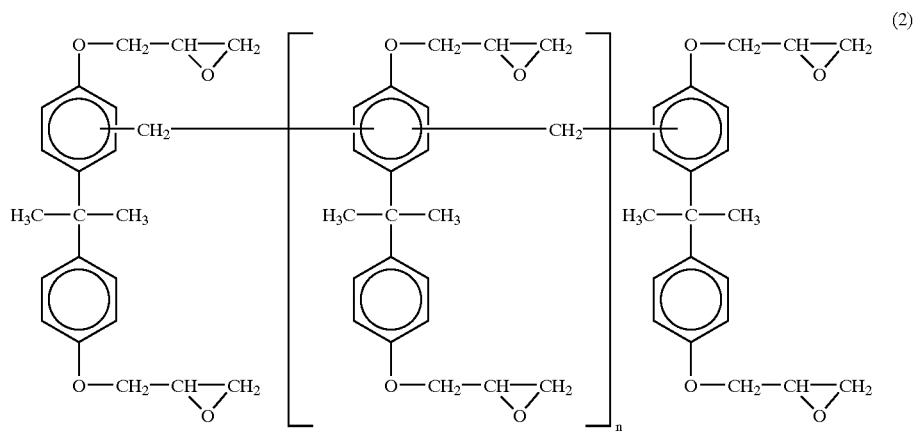

wherein n represents a number of 0 or greater.

The latent curing agent as component (b) is preferably an amine adduct-type curing agent, or else the latent curing agent of component (b) is preferably a microcapsular curing agent.

The aromatic amine-based curing agent and/or alicyclic amine-based curing agent as component (c), if it is an aromatic amine-based curing agent, is preferably diaminodiphenylsulfone or diaminodiphenylmethane.

The epoxy resin composition according to the invention preferably further comprises a curing accelerator as component (d).

The viscosity of an epoxy resin composition of the invention, when the epoxy resin composition is prepared and allowed to stand at 25° C. for 3 weeks, is preferably no greater than twice the viscosity immediately after preparation of the resin composition.

Also, the epoxy resin composition of the invention preferably gives a cured product with a curing degree of at least 70% when obtained by primary curing for no more than 10 hours at a temperature of 100° C. or below, and it preferably gives a cured product with a tensile shear strength (adhesive strength) of at least 10 MPa according to JIS-K-6848 and JIS-K-6850.

A prepreg according to the invention comprises a reinforcing fiber material impregnated with the epoxy resin composition having the constitution described above.

BRIEF DESCRIPTION OF THE DRAWINGS

FIG. 1 is a graph used to determine the Tg of a cured product from the intersection between the tangent of the graph for the cured product in a glass state and the tangent of the graph in the transition area.

BEST MODE FOR CARRYING OUT THE INVENTION

The epoxy resin as component (a) of the epoxy resin composition according to the invention is not particularly restricted, and a bisphenol-type, novolac-type, cresol/novolac-type or aminoglycidyl-type epoxy resin may be used. The epoxy resin used as component (a) may be one composed mainly of a trifunctional or greater epoxy resin in order to achieve excellent heat resistance for cured products obtained by secondary curing.

If the content of the trifunctional or greater functional epoxy resin in the epoxy resin of component (a) is less than 40 wt %, the cured product obtained by secondary curing may not possess sufficient heat resistance. The epoxy resin composed mainly of a trifunctional or greater functional epoxy resin is therefore preferably one containing the trifunctional or greater function epoxy resin at 40 wt % or greater in the epoxy resin of component (a), and more preferably it is one containing the trifunctional or greater functional epoxy resin at 60 wt % or greater in the epoxy resin of component (a).

As trifunctional or greater functional epoxy resins there may be mentioned tetraglycidyldiaminodiphenylmethane, aminophenol-type epoxy resins, aminocresol-type epoxy resins, phenol/novolac-type epoxy resins, cresol/novolac-type epoxy resins and epoxy resins represented by the following chemical formulas (3) and (4).

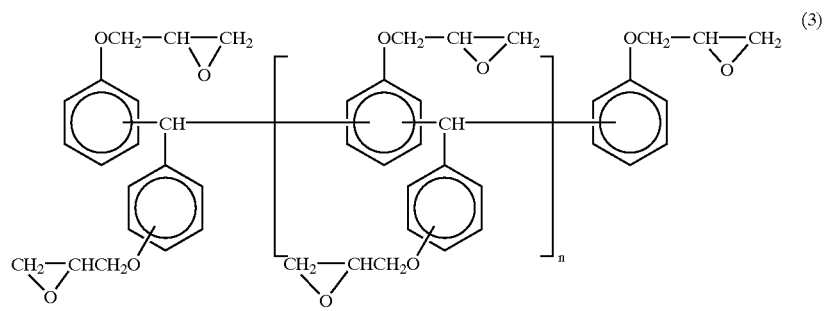

wherein n represents a number of 0 or greater,

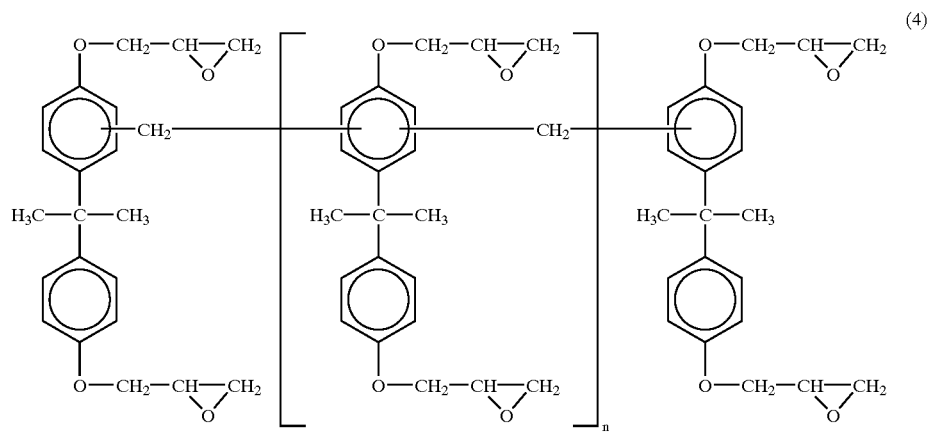

wherein n represents a number of 0 or greater.

Particularly preferred as trifunctional or greater epoxy resins are novolac-type epoxy resins represented by chemical formula (3) above and/or tetraglycidyldiaminodiphenylmethane.

As epoxy resins other than trifunctional epoxy resins in the epoxy resin of component (a) there may be mentioned, for example, bisphenol-type epoxy resins, hydrogenated bisphenol-type epoxy resins, biphenol-type epoxy resins and naphthalenediol-type epoxy resins, but for higher heat resistance of the cured product obtained by secondary curing, it is preferred to use an epoxy resin having a relatively rigid backbone structure such as a biphenol-type epoxy resin or naphthalenediol-type epoxy resin.

When using, for example, a bisphenol S-type epoxy resin having an $SO_2$ structure or the pre-reaction product of an aromatic diamine and a bisphenol-type epoxy resin, secondary curing gives a cured product with comparatively high heat resistance and excellent toughness.

When an epoxy resin having an oxazolidone ring as represented by the following chemical formula (5) is used, the epoxy resin composition exhibits satisfactory adhesion with reinforcing fiber materials, resulting in a fiber-reinforced composite material with excellent mechanical properties.

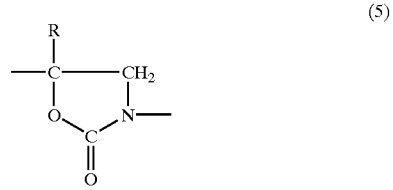

wherein R represents hydrogen or an alkyl group.

When the epoxy resin with an oxazolidone ring is an epoxy resin composed of a unit represented by chemical formula (6) below, the epoxy resin composition exhibits even more satisfactory adhesion with reinforcing fiber materials, resulting in a fiber-reinforced composite material with even more excellent mechanical properties.

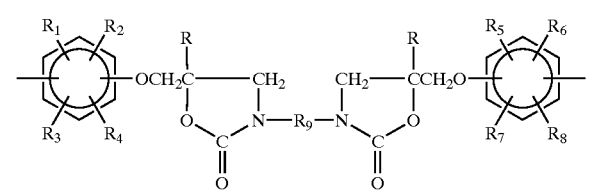

wherein each R independently represents hydrogen or an alkyl group, $R_1$–$R_8$ each independently represent a halogen or hydrogen atom or an alkyl group of 1–4 carbons, and $R_9$ represents a group of chemical formula (7) or (8) below.

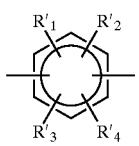

(7)

wherein R'₁–R'₄ each independently represent hydrogen or an alkyl group of 1–4 carbons.

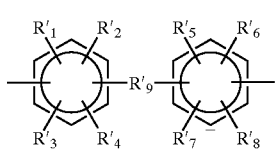

(8)

wherein R'₁–R'₈ each independently represent hydrogen or an alkyl group of 1–4 carbons, and R'₉ represents a single bond, —CH₂—, —C(CH₃)₂—, —SO₂—, —SO—, —S— or —O—.

As epoxy resins with oxazolidone rings represented by chemical formula (5) above there may be mentioned ARALDITE XAC4151 and XAC4152, by Asahi-Ciba.

The curing agent of component (b) is a latent curing agent with curing power at 100° C. or below. That is, the curing agent of component (b) possesses curing power at up to 100° C. and has heating latent reactivity, or latency.

The curing power of a curing agent at 100° C. or below may be identified in the following manner. Specifically, an epoxy resin composition is obtained by uniformly mixing 100 parts by weight of a liquid bisphenol A type epoxy resin with 184–194 epoxy equivalents (for example, Epikote 828 by Japan Epoxy Resins Co., Ltd.) and 20 parts by weight of the curing agent, and then the heat generated upon curing under temperature elevating conditions of 10° C./min by DSC is measured and the curing agent is judged to have curing power at 100° C. or below if the temperature at which curing generated heat occurs, away from the baseline on a DSC chart, is 100° C. or below. Using a curing agent with an initial curing generated heat temperature of 90° C. or below is preferred to obtain an epoxy resin composition with satisfactory reactivity at 90° C. and below.

If a curing agent has heating latent reactivity, or latency, then it will undergo virtually no reaction at temperatures near room temperature. The latency of a curing agent which undergoes virtually no reaction at near room temperature can be confirmed in the following manner. Specifically, an epoxy resin composition is obtained by uniformly mixing 100 parts by weight of a liquid bisphenol A type epoxy resin with 184–194 epoxy equivalents (for example, Epikote 828 by Japan Epoxy Resins Co., Ltd.) and 20 parts by weight of the curing agent, and the curing agent may be said to have latency if the viscosity after standing at 30° C. for 3 weeks is no greater than twice the viscosity before standing. More excellent and favorable latent reactivity is exhibited by a curing agent wherein the viscosity is no greater than 1.5 times the viscosity before standing, after the epoxy resin composition has been allowed to stand at 30° C. for 3 weeks.

The viscosity of the epoxy resin composition containing the curing agent is measured in the following manner. Specifically, a DSR-200 by Rheometrics or a measuring apparatus with performance equal thereto is used for measurement of the 30° C. isothermal viscosity using two 25-mm diameter disc plates at a disc plate gap of 0.5 mm, under conditions with a shear rate of 10 radians/sec, and the data is recorded 10 minutes after the start of measurement. The viscosity of the epoxy resin composition being measured is determined by this method before and after being allowed to stand at 30° C. for 3 weeks, and the presence or absence of latent reactivity is determined.

The curing agent as component (b) is not particularly restricted so long as it possesses curing power at up to 100° C. and has heating latent reactivity, as explained above, but using a microcapsular curing agent can give an epoxy resin composition according to the invention with an excellent balance between curability at 90° C. and below and stability at near room temperature. The products Novacure HX3721 and HX3722 by Asahi-Ciba Co., Ltd. may be mentioned as curing agents for component (b) which have excellent curing power at up to 100° C. and latency at room temperature, and which form microcapsules.

An epoxy resin composition using an amine adduct-type curing agent as the curing agent of component (b) is even more suitable for providing curing power at 90° C. or below and satisfactory stability at near room temperature. As amine adduct-type curing agents there may be mentioned Fujicure FXE1000 and FXE1030 by Fuji Chemical Industry Co., Ltd., PN-23 by Ajinomoto Co., Inc., ACR Hardener H-3615, H-4070, H-3293, H-3366, H-3849 and H-3670 A.C.R. Co., Ltd., and Cureduct P-0505 by Shikoku Chemical Industries, Inc.

If the content of the latent curing agent as component (b) is less than 3 parts by weight to 100 parts by weight of the epoxy resin of component (a), the primary curing will tend to be insufficient at temperatures of 100° C. and below, while if it is greater than 40 parts by weight, the stability of the resin composition at room temperature will tend to be reduced, and therefore the preferred range is 3–40 parts by weight. This refers, of course, to the weight of only the curing agent as the effective component in cases where a paste-like curing agent is obtained through premixing of the curing agent with a low viscosity epoxy resin.

In a primary curing step at relatively low temperature for a relatively short period of time, the epoxy resin composition of the invention cures in a releasable manner by the action of the curing agent of component (b), and then in subsequent secondary curing at high temperature, the releasable cured product is converted by the action of the aromatic amine-based curing agent and/or alicyclic amine-based curing agent of component (c), into a cured product with a completely crosslinked structure exhibiting high heat resistance, i.e., a cured product with a high glass transition temperature and excellent rigidity at high temperature.

As aromatic amine-based curing agents, among aromatic amine-based curing agents and/or alicyclic amine-based curing agents for component (c), there are preferred aromatic polyamines, examples of which include xylylenediamines, diaminodiphenylmethanes, diaminodiphenylsulfones, phenylenediamines, dimethylthiotoluenediamines and the like, with diaminodiphenylmethanes and diaminodiphenylsulfones being especially preferred. As diaminodiphenylsulfones there may be mentioned 3,3'-diaminodiphenylsulfone and 4,4'-diaminodiphenylsulfone.

As alicyclic amine-based curing agents there are preferred alicyclic polyamines, examples of which include menthenediamine, isophoronediamine, bis(4-amino-3-methylcyclohexyl)methane, bis(4-aminocyclohexyl)methane and bis(aminomethyl)cyclohexane.

If the content of the aromatic amine-based curing agent and/or alicyclic amine-based curing agent of component (c) is less than 10 parts by weight to 100 parts by weight of the epoxy resin of component (a), the cured product obtained by secondary curing will tend to have a lower glass transition temperature and/or reduced rigidity at high temperature, while if it is greater than 40 parts by weight, the cured product obtained by secondary curing will have more unreacted amine residues and therefore increased hygroscopicity or greater fragility, and therefore the preferred range is 10–40 parts by weight.

The epoxy resin composition of the invention may also contain a curing accelerator as component (d) in order to accelerate curing for the primary cured product. As component (d) it may contain a curing accelerator comprising, for example, a urea compound, cyano compound, dihydrazide compound, acid anhydride or the like.

In particular, if a urea compound is used as the curing accelerator of component (d) it is possible to obtain an epoxy resin composition with excellent primary curability at relatively low temperatures, without sacrificing stability of the resin composition at room temperature. Especially preferred as urea compounds to be included in the curing accelerator of component (d) are aromatic urea compounds, and even more preferred are compounds represented by the following chemical formula (9).

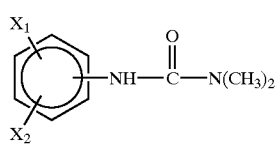

(9)

wherein $X_1$ and $X_2$ represent hydrogen or chlorine, $X_1$ and $X_2$ being either the same or different.

The viscosity of the epoxy resin composition of the invention, when the epoxy resin composition has been prepared and allowed to stand at 25° C. for 3 weeks, is preferably no greater than twice the viscosity immediately after preparation of the resin composition. The composition has excellent stability at room temperature, and it is preferably cured in a releasable manner by primary curing for no more than 10 hours at 100° C. or below, more preferably cured in a releasable manner by primary curing for no more than 5 hours at 100° C. or below, from the standpoint of the molding cycle, and even more preferably it is cured in a releasable manner by primary curing for no more than 5 hours at 90° C. or below.

The viscosity of the epoxy resin composition, when it has been prepared and allowed to stand at 25° C. for 3 weeks, is even more preferably no greater than 1.5 times the viscosity immediately after preparation of the resin composition, for a longer working life of the epoxy resin composition.

The viscosity of the epoxy resin composition is measured in the following manner. The viscosity $\eta i$ of the epoxy resin composition at 40° C. immediately after preparation is measured using a Rheometrics DSR-200 or an apparatus with performance equivalent thereto, with parallel plates at a frequency of 10 radians/sec, and then the epoxy resin composition is allowed to stand in a thermostatic chamber at 25° C. for 3 weeks, after which the viscosity $\eta$ is measured at 40° C. in the same manner and the increase in viscosity is determined as $\eta/\eta i$.

The following method is used to determine whether or not the epoxy resin composition cures in a releasable manner by the primary curing. Specifically, curing is judged to be releasable if the curing degree is at least 70%, as determined by the formula curing degree (%)={(Ei)–(E1)}×100/Ei where the curing generated heat (Ei) of the prepared epoxy resin composition and the primary curing generated heat (E1) of the epoxy resin composition are measured using a differential scanning calorimeter (DSC), or if the tensile shear strength (adhesive strength) of the primary cured product of the epoxy resin composition is at least 10 MPa according to JIS-K-6848 and JIS-K-6850.

The measurement of the tensile shear strength (adhesive strength) of the primary cured product of the epoxy resin composition according to JIS-K-6848 and JIS-K-6850 is accomplished using a sample fabricated by polishing the 12.5 mm lap section of a 25×100×1.5 mm aluminum plate (A2024P specified by JIS-H-4000) with sandpaper (#240) and degreasing it with acetone, evenly coating the epoxy resin composition to be measured onto the lap section, combining it with the lap section of another aluminum plate polished and degreased in the same manner, and then subjecting these to primary curing while fixed under a pressure of 1 kgf/cm$^2$ and slowly cooling to room temperature.

The epoxy resin composition of the invention is preferably one with a glass transition temperature of 150° C. or above as the cured product obtained by subjecting the primary product cured at a low temperature of 100° C. or below to secondary curing at a temperature of 130° C. or above. Particularly excellent heat resistance is exhibited if the cured product of the epoxy resin composition has a glass transition temperature of 180° C. or above when cured by secondary curing at 150° C. or above (for example, 180° C.). The curing time for secondary curing is not particularly restricted, but is preferably no longer than 10 hours and more preferably no longer than 5 hours.

The glass transition temperature of the cured product is measured by the following method. Specifically, a Rheometrics RDA-700 or a viscoelasticity measuring apparatus with performance equivalent thereto is used to measure the storage elastic modulus (G') at various temperatures when the temperature of the cured product to be measured is raised in a stepwise manner. The temperature is raised by 5° C./step, and at each step, measurement is taken at a frequency of 10 radians/sec after temperature stabilization and holding at the temperature for 1 minute. The logarithm of the storage elastic modulus (G') is plotted against temperature, as shown in FIG. 1, and the glass transition temperature is determined as the temperature at the intersection of the tangents of the obtained G' curves.

The epoxy resin composition of the invention may also contain other additives within the spirit of the object of the invention. For example, by dissolving and adding a thermoplastic resin it is possible to prevent stickiness of the resin composition, adjust the tack of the prepreg to a suitable level or reduce changes in the tack with time. As examples of such thermoplastic resins there may be mentioned phenoxy resins, polyvinylformal, polyethersulfones, and the like.

The epoxy resin composition of the invention may also contain an added fine particulate or short fibrous thermoplastic resin or rubber component, for improved toughness of the obtained cured product and, as such additives, there may be mentioned thermoplastic resins such as polyamides, polyimides, polyurethanes, polyethersulfones and the like, or rubber components such as acryl rubber, butadiene rubber and butyl rubber, as well as their molecular end-modified derivatives.

The epoxy resin composition of the invention may also contain added fine particles of an inorganic component such as talc or silica, or a metal such as steel, for the purpose of improving the rigidity of the obtained cured product.

There are no particular restrictions on the purpose of use of the epoxy resin composition of the invention, and for example, it may be applied as a matrix resin for fiber-reinforced composite materials or as an adhesive for structural materials, but it may be used with particular suitability as a matrix resin for fiber-reinforced composite materials.

There are no particular restrictions on reinforcing fiber materials for molding of a fiber-reinforced composite material, and any reinforcing fiber material commonly used for fiber-reinforced composite materials, such as carbon fiber, glass fiber, high-stirring organic fiber, metal fiber or inorganic fiber, may be used. There are also no particular restrictions on the form of the reinforcing fiber material, and for example, it may be a unidirectional material, cloth or mat, or a tow composed of several thousand or more filaments.

An epoxy resin composition according to the invention will be suitable as a matrix resin to be impregnated into a reinforcing fiber material as a prepreg for formation of a sheet, if its viscosity at 60° C. is at least 10 Pa·sec and preferably at least 30 Pa·sec, and no greater than 700 Pa·sec and preferably no greater than 500 Pa·sec.

That is, the viscosity of the epoxy resin composition at 60° C. is preferably not lower than 10 Pa·sec since the tack or stickiness of the prepreg will be too strong, and it is preferably not greater than 700 Pa·sec because the prepreg will exhibit an inadequate drape property and exhibit excessive hardness. The method of measuring the viscosity of the epoxy resin composition at 60° C. is the same method used for measurement of the viscosity of the epoxy resin composition as explained above, except that the measuring temperature is 60° C.

The epoxy resin composition of the invention may be formed into a film to interrupt the resin flow or may be used as a sheet-like adhesive by being impregnated into a glass cloth or the like. The epoxy resin composition of the invention may also contain microballoons or foaming agents as additives, if the purpose of use is as a weight-reducing subsidiary material.

In addition, as curing can be carried out at low temperatures of 100° C. and below, a high-toughness material such as a thermoplastic resin or rubber component may be selectively added near the surface of a prepreg impregnated with the epoxy resin composition of the invention to increase the interlayer toughness of the obtained laminated cured product, so that the molding can be accomplished while maintaining the form even if a low-melting-point thermoplastic resin is added. This facilitates morphology control and makes it possible to situate the designed amount of high-toughness material, such as a thermoplastic resin or rubber component, between the layers to obtain the designed interlayer toughness. There are no particular restrictions on the form of the high-toughness material (such as a thermoplastic resin or rubber component) which is situated between the layers, but preferably a high-toughness material which forms particles or long or short fibers is selectively situated between the layers.

There are also no particular restrictions on the method of preparing the epoxy resin composition of the invention, but when a solid epoxy resin or thermoplastic resin is included by dissolution, the solid component is preferably used as a homogeneous solution in an epoxy resin in which it is soluble.

When the latent curing agent with curability at 100° C. or below as component (b) is in powder form, it may be added after using an epoxy resin with relatively low viscosity in the epoxy resin component (a) to make a paste, as this will prevent secondary aggregation of the powdery component (b) and permit uniform dispersion. When component (b) is in solid form, it is preferably pulverized into a powder and then added after making a paste with the low-viscosity epoxy resin. When component (b) is a microcapsular latent curing agent, stirring with a strong shear stress will have an adverse effect on the capsules and impair their stability at room temperature. Thus, a microcapsular latent curing agent is preferably used as a master batch prepared beforehand as a uniform mixture with the low-viscosity epoxy resin.

In cases where component (c) does not dissolve by the primary curing, that is, when the melting point of component (c) is higher than the primary curing temperature or the dissolution temperature of component (c) in the epoxy resin is higher than the primary curing temperature, the aromatic amine-based curing agent and/or alicyclic amine-based curing agent of component (c) is preferably added in the form of a prepared dissolution in the epoxy resin of component (a). Alternatively, when component (c) is in a powder form which dissolves in the primary curing, its addition after forming a paste with a relatively low-viscosity epoxy resin in component (a) will prevent secondary aggregation of the component (c) powder and allow even dispersion. When component (c) is a solid which dissolves in the primary curing, it is preferably pulverized into a powder and then added after forming a paste with a low-viscosity epoxy resin. When component (c) is a liquid, it may be added and uniformly mixed at any stage.

As the epoxy resin composition of the invention is characterized by undergoing initial reaction at low temperature, it is preferably prepared at 70° C. or below after addition of the latent curing agent of component (b), in order to stabilize the epoxy resin composition at room temperature. Preparation at 60° C. or below can further improve the stability of the epoxy resin composition at room temperature.

The method of preparing a prepreg using an epoxy resin composition according to the invention is preferably a hot-melt process. When the epoxy resin composition is coated onto a release step sheet to obtain an epoxy resin composition film to be used to prepare a prepreg by a hot-melt process, the coating is preferably carried out at 70° C. or below, and more preferably at 60° C. or below, in order to stabilize the life of the obtained prepreg.

Examples and comparative examples will now be provided for explanation of epoxy resin compositions of the invention and the concrete structure of a prepreg obtained using the epoxy resin compositions. The abbreviations for the components used in the epoxy resin compositions of the examples and comparative examples are as follows.

(1) Trifunctional or Greater Functional Epoxy Resins

Ep604: tetraglycidyldiaminodiphenylmethane, "EPIKOTE 604", product of Japan Epoxy Resins Co., Ltd.

TACTIX742: solid trifunctional epoxy resin corresponding to formula (1) wherein n=0, "TACTIX 742", product of The Dow Chemical Company.

Ep1032: special novolac-type epoxy resin corresponding to formula (1) wherein n>0, "EPIKOTE 1032S50", product of Japan Epoxy Resins Co., Ltd.

Ep157: Ep157S65: special novolac-type epoxy resin corresponding to formula (2) wherein n>0, "EPIKOTE 157S65", product of Japan Epoxy Resins Co., Ltd.

ELM-100: aminophenol-type epoxy resin, "SUMIEPOXY ELM-100", product of Sumitomo Chemical Co., Ltd.

N-740: phenol/novolac-type epoxy resin, "EPICLON N-740", product of Dainippon Ink & Chemicals Inc.

N-670: cresol/novolac epoxy resin, "EPICLON N-670", product of Dainippon Ink & Chemicals Inc.

(2) Epoxy Resins Other than Trifunctional or Greater Functional Epoxy Resins

Ep828: liquid bisphenol A epoxy resin, "EPIKOTE 828", product of Japan Epoxy Resins Co., Ltd.

Ep1001: semi-solid bisphenol A epoxy resin, "EPIKOTE 1001", product of Japan Epoxy Resins Co., Ltd.

Ep5050: flame-retardant epoxy resin, "EPIKOTE 5050", product of Japan Epoxy Resins Co., Ltd.

XAC4152: modified epoxy resin, "ARALDITE XAC4152", product of Asahi-Ciba Co., Ltd.

(3) Latent Curing Agents with Curing Power at 100° C. and Below

HX3722: "NOVACURE HX3722", product of Asahi-Ciba Co., Ltd.

FXE1000: "FUJICURE FXE-1000", product of Fuji Kasei Kogyo Co., Ltd.

PN23: "AMICURE PN-23", product of Ajinomoto Co., Inc.

(4) Aromatic Amine-Based or Alicyclic Amine-Based Curing Agents

DDS: diaminodiphenylsulfone, "SEIKACURE", product of Wakayama Seika Kogyo Co., Ltd.

DDM: diaminodiphenylmethane, product of Hodogaya Chemical Co., Ltd.

BACHM: bis(4-aminocyclohexyl)methane, "WANDAMIN HM", product of New Japan Chemical Co., Ltd.

ET300: dimethylthiotoluenediamine, "ETACURE 300", product of Ethyl Corporation (5) Curing Accelerators PDMU: phenyldimethylurea, "OMICURE 94", product of B.T.R. Japan DCMU: dichlorophenyldimethylurea, "DCMU 99", product of Hodogaya Chemical Co., Ltd.

(6) Other Components

PES: polyether sulfone, "SUMIKA EXCEL PES 3600P", product of Sumitomo Chemical Co., Ltd.

Aerosil 300: "Aerosil 300", product of Nippon Aerosil Co., Ltd.

BF3MEA: boron trifluoride monomethylamine complex

Dicy: dicyandiamide, "Dicy 7", product of Japan Epoxy Resins Co., Ltd.

T#241: "TOHMIDE #241", product of Fuji Kasei Kogyo Co., Ltd.

EXAMPLES 1–11

Epoxy resin compositions were obtained having the components listed in the respective columns of Tables 1 and 2 below. The values in the tables indicate the parts by weight of the added components.

The procedure for adding the components was as follows. First, the epoxy resins of component (a) were heated to 150° C. and mixed to uniformity. When another component such as a thermoplastic resin or inorganic substance was present among the components, it was added to the heated mixture of components (a) and dissolved or dispersed therein.

Next, component (a) or the mixture of component (a) and another component was lowered to a temperature of 130° C. and the aromatic amine-based curing agent and/or alicyclic amine-based curing agent of component (c) was added and uniformly dissolved. This was immediately followed by cooling to 50–60° C., addition of component (b) and, depending on the case, addition of component (d) as a curing accelerator, and then mixing to uniformity to prepare epoxy resin compositions.

The stability of each of the obtained epoxy resin compositions was evaluated based on the ratio of viscosity increase after standing at 25° C. for 3 weeks (viscosity increase factor). The results are listed in Tables 1 and 2.

Each epoxy resin composition was then heated to 60° C. for defoaming and cast onto a release-treated glass plate with a thickness of 2 mm, which was then sandwiched with a glass plate treated in the same manner and raised to a temperature of 100° C. over a period of one hour, and subsequently subjected to primary curing for 4 hours at 100° C. The curing degree in the primary curing was determined by the curing degree measuring method by DSC described above. The results are listed in Tables 1 and 2. Separately, each of the obtained epoxy resin compositions was raised to a temperature of 100° C. over a period of one hour and subjected to primary curing for 4 hours at 100° C., after which the tensile shear strength (adhesive strength) of the primary cured product was measured according to JIS-K-6848 and JIS-K-6850. The results are listed in Tables 1 and 2.

Next, the primary cured product, obtained when determining the curing degree of the product of primary curing, was released and allowed to stand in a hot-air furnace in a free standing state, the temperature was raised to 180° C. over a period of 2 hours, and then secondary curing was carried out at 180° C. for 4 hours. The glass transition temperatures (° C.) of the secondary cured products are listed in Tables 1 and 2, together with the G' values at 150° C. and 180° C. The G' values at 150° C. and 180° C. are indices of the high-temperature properties of composite materials employing the epoxy resin compositions.

TABLE 1

| | | | | Example | | | | | |
|---|---|---|---|---|---|---|---|---|---|
| | No. | | | 1 | 2 | 3 | 4 | 5 | 6 |
| Composition | a | Ep604 | | 65 | 65 | 65 | 65 | 65 | 65 |
| | | TACTIX742 | | 33 | 33 | 33 | 33 | 33 | 33 |
| | | Ep828 | | 2 | 2 | 2 | 2 | 2 | 2 |
| | b | HX3722 | | 10 | 10 | | | 10 | 10 |
| | | FXE1000 | | | | 10 | | | |
| | | PN23 | | | | | 10 | | |
| | c | DDS | | 21 | 21 | 21 | 21 | | |
| | | DDM | | | | | | 25 | |
| | | BACHM | | | | | | | 23 |
| | d | PDMU | | 2 | 2 | | | | |
| | | DCMU | | | | 2 | 2 | 2 | 2 |
| | Other | PES | | | 2 | | | | |
| | | Aerosil 300 | | | | | | | 5 |

TABLE 1-continued

|  | Example | | | | | |
|---|---|---|---|---|---|---|
| No. | 1 | 2 | 3 | 4 | 5 | 6 |
| Stability of resin composition (viscosity increase factor) | 1.1 | 1.1 | 1.3 | 1.2 | 1.2 | 1.5 |
| Curing degree of primary cured product (%) | 90 | 90 | 91 | 91 | 88 | 92 |
| Tensile shear strength of primary cured product (MPa) | 18 | 20 | 18 | 17 | 17 | 19 |
| Glass transition temperature of secondary cured product (° C.) | 201 | 200 | 198 | 196 | 190 | 182 |
| G' of secondary cured product (150° C.) × $10^9$ dyne/cm$^2$) | 10.5 | 10.2 | 10.0 | 9.8 | 9.5 | 9.0 |
| G' of secondary cured product (180° C.) × $10^9$ dyne/cm$^2$). | 9.3 | 9.2 | 9.2 | 9.0 | 8.6 | 7.8 |

TABLE 2

|  |  |  | Example | | | | |
|---|---|---|---|---|---|---|---|
|  | No. |  | 7 | 8 | 9 | 10 | 11 |
| Composition | a | Ep604 | 65 | 55 | 30 | 60 | 60 |
|  |  | TACTIX742 | 33 | 20 | 55 |  |  |
|  |  | Ep1032 |  |  |  | 35 |  |
|  |  | ELM100 |  |  |  |  | 35 |
|  |  | Ep828 | 2 | 10 | 3 | 2 | 2 |
|  |  | Ep1001 |  | 15 | 12 | 3 | 3 |
|  | b | HX3722 | 25 | 20 | 15 | 15 | 15 |
|  | c | DDS | 21 | 23 | 23 | 21 | 21 |
|  | d | PDMU |  | 2 |  | 2 | 2 |
|  |  | DCMU |  |  | 2 |  |  |
|  | Other | PES |  | 2 | 2 |  |  |
| Stability of resin composition (viscosity increase factor) |  |  | 1.4 | 1.1 | 1.1 | 1.1 | 1.3 |
| Curing degree of primary cured product (%) |  |  | 92 | 90 | 88 | 92 | 88 |
| Tensile shear strength of primary cured product (MPa) |  |  | 17 | 19 | 18 | 19 | 18 |
| Glass transition temperature of secondary cured product (° C.) |  |  | 190 | 193 | 197 | 200 | 182 |
| G' of secondary cured product (150° C.) × $10^9$ dyne/cm$^2$) |  |  | 10.0 | 9.7 | 10.0 | 10.3 | 9.2 |
| G' of secondary cured product (180° C.) × $10^9$ dyne/cm$^2$) |  |  | 9.0 | 8.9 | 9.3 | 9.2 | 8.0 |

COMPARATIVE EXAMPLE 1

An epoxy resin composition comprising the components listed in the respective columns of Table 3 was obtained by dissolving and mixing DDS in EP604 at 130° C. and then immediately lowering the temperature to 70° C. and dissolving and mixing BF3MEA therewith.

The obtained epoxy resin composition was stable at room temperature and gave a cured product with a glass transition temperature of 205° C. upon curing at 180° C. for 2 hours, but curability was poor even with primary curing at 100° C. for 10 hours.

COMPARATIVE EXAMPLE 2

An epoxy resin composition comprising the components listed in the respective columns of Table 3 was obtained by uniformly mixing Ep828 and Ep1001 at 120° C. and then lowering the temperature to 60° C. and adding and mixing HX3722 and PDMU.

The stability of the epoxy resin composition, the curing degree of a primary cured product subjected to primary curing at 100° C. for 4 hours, the tensile shear strength (adhesive strength) of the primary cured product, the glass transition temperature (° C.) of a secondary cured product subjected to secondary curing at 180° C. for 4 hours and the G' values at 150° C. and 180° C., were measured in the same manner as described in Example 1. The results are listed in Table 3. The epoxy resin composition did not give a cured product exhibiting adequate heat resistance after secondary curing.

COMPARATIVE EXAMPLE 3

An epoxy resin composition comprising the components listed in the respective columns of Table 3 was obtained by uniformly mixing Ep1032, EP828 and Ep1001 at 120° C. and then lowering the temperature to 70° C. and adding, dispersing and mixing PDMU and Dicy.

The stability of the epoxy resin composition, the curing degree of a primary cured product, the tensile shear strength (adhesive strength) of the primary cured product, the glass transition temperature (° C.) of a secondary cured product and the G' values at 150° C. and 180° C., were measured in the same manner as described in Comparative Example 2. The results are listed in Table 3. The epoxy resin composition did not give a cured product exhibiting adequate heat resistance after secondary curing.

TABLE 3

|  |  |  | Comp. Ex. | | |
|---|---|---|---|---|---|
|  | No. |  | 1 | 2 | 3 |
| Composition | a | Ep604 | 100 |  |  |
|  |  | Ep1032 |  |  | 10 |
|  |  | Ep828 |  | 10 | 10 |
|  |  | Ep1001 |  | 90 | 80 |
|  | b | HX3722 |  | 10 |  |
|  | c | DDS | 50 |  |  |
|  | d | PDMU |  | 5 | 5 |
|  | Other | BF3MEA | 0.5 |  |  |
|  |  | Dicy |  |  | 8 |
| Stability of resin composition (viscosity increase factor) |  |  | 1.1 | 1.2 | 1.2 |
| Curing degree of primary cured product (%) |  |  | 40 | 94 | 93 |
| Tensile shear strength of primary cured product (MPa) |  |  | Unmeasurable | 19 | 19 |
| Glass transition temperature of secondary cured product (° C.) |  |  |  | 132 | 143 |
| G' of secondary cured product (150° C.) × $10^9$ dyne/cm$^2$ |  |  |  | 3.5 | 4.0 |
| G' of secondary cured product (180° C.) × $10^9$ dyne/cm$^2$ |  |  |  | 0.2 | 2.0 |

EXAMPLE 12

An epoxy resin composition was prepared in the same manner as Example 2. The viscosity of this epoxy resin composition at 60° C. was 100 Pa·sec. The epoxy resin composition heated at 60° C. was evenly coated onto a release step sheet to fabricate a resin film with a basis weight of 80 g/m².

On the resin film, "TR50S-12L" carbon fiber manufactured by Mitsubishi Rayon Co., Ltd. was arranged in one direction into a carbon fiber mat of a basis weight of 150 g/m², and then subjected to heat and pressure for impregnation of the epoxy resin composition into the carbon fiber mat to obtain a unidirectional prepreg. The prepreg had satisfactory tack and drape property.

After allowing the prepreg to stand at 25° C. for 3 weeks and evaluating the changes in tack and drape property with time by touch, it was found to have little change in tack and drape property even after standing for 3 weeks, thereby indicating a satisfactory working life.

The prepreg was then 14-ply laminated along one direction and subjected to primary curing by vacuum bag molding. The primary curing was accomplished by raising the temperature from room temperature to 100° C. over a period of one hour, and keeping it at 100° C. for 4 hours. The molded article obtained by the primary curing was adequately releasable, and produced no cracks even when cut with a diamond wet cutter. The glass transition temperature of the primary cured molded article was 120° C.

The primary cured molded article was then allowed to stand in a hot-air furnace (free standing) for secondary curing. The secondary curing was accomplished by raising the temperature from room temperature to 180° C. over a period of 3 hours, keeping it at 180° C. for 4 hours, and then cooling it to room temperature over a period of 3 hours.

The cured product with a thickness of approximately 2 mm was examined by ultrasonic flaw detection, which indicated a virtual absence of voids. A sample was also cut out from the cured product, and upon measuring G' to determine its glass transition temperature (° C.), the result was 199° C. The interlayer shear strength of the cured product at room temperature (23° C.), 100° C., 160° C. and 180° C. was measured according to ASTM D2344. The results are shown in Table 4.

EXAMPLE 13

An epoxy resin composition was prepared in the same manner as Example 9. The viscosity of the epoxy resin composition at 60° C. was 50 Pa·sec. The epoxy resin composition was used to obtain a unidirectional prepreg in the same manner as Example 12. The prepreg had satisfactory tack and drape property, and exhibited little change in tack and drape property even after standing at 25° C. for 3 weeks, thus indicating a satisfactory working life.

Upon subsequently molding a primary cured sheet from the unidirectional prepreg in the same manner as Example 12, the molded article obtained by the primary curing was adequately releasable, and produced no cracks even when cut with a diamond wet cutter. The glass transition temperature of the primary cured molded article was 115° C.

The primary cured molded article was then allowed to stand in a hot-air furnace (free standing) for secondary curing. The secondary curing was accomplished in the same manner as Example 12.

The cured product with a thickness of approximately 2 mm was examined by ultrasonic flaw detection, which indicated the present of a small degree of voids that were not of any significant problem. A sample was also cut out from the cured product, and upon measuring G' to determine its glass transition temperature (° C.), the result was 189° C. The interlayer shear strength of the cured product at room temperature (23° C.), 100° C., 160° C. and 180° C. was measured according to ASTM D2344. The results are shown in Table 4.

TABLE 4

| Interlayer shear strength of cured product (MPa) | | | | |
|---|---|---|---|---|
| Measuring temperature | 23° C. | 100° C. | 160° C. | 180° C. |
| Example 12 | 90 | 68 | 53 | 48 |
| Example 13 | 92 | 65 | 50 | 45 |

EXAMPLE 14

An epoxy resin composition was obtained comprising the components listed in the respective columns of Table 5. Upon examining the curing power of HX3722 as component (b), the initial temperature for curing generated heat was 86° C., and curing power was exhibited at below 100° C. Upon examining the stability at room temperature, i.e. the latent reactivity, the viscosity was found to increase by a factor of 1.1, indicating very high stability at near room temperature, and excellent latency.

As the mixing procedure for the epoxy resin composition of the invention, the first component (c) was added to the components of (a) except for Ep828 and dissolved therein at 100° C., after which the temperature was immediately lowered to 50° C., and Ep828 and component (b) were added and uniformly mixed therewith. The stability of the epoxy resin composition was confirmed based on the viscosity increase factor after standing at 25° C. for 3 weeks, which was a factor of 1.5, indicating excellent stability at 25° C.

The epoxy resin composition was then subjected to primary curing at 90° C. for 2 hours, and a 2 mm-thick sheet was molded.

The releasability of the molded sheet upon release from the die is shown in Table 5, based on the following scale: ⊚=Releasable with no problems; ○=Releasable; x=Not easily releasable, bends or cracks produced.

The primary cured molded sheet was then subjected to secondary curing at 200° C. for 4 hours. The glass transition temperature (° C.) Tg of the cured sheet obtained by secondary curing was determined to be 185° C. by a measuring method based on the G' temperature distribution, using a Rheometrics RDS-700. The results are shown in Table 5.

EXAMPLES 15–22

Epoxy resin compositions were obtained comprising the components listed in the respective columns of Tables 5 and 6.

As the mixing procedure for the epoxy resin compositions of the invention for Examples 15, 16, 17, 20 and 22 (which contained Ep828 in component (a)), component (c) was added to the components of (a) except for Ep828 and dissolved therein at 100° C., after which the temperature was immediately lowered to 50° C., and a mixture of Ep828 and PDMU as component (d), uniformly mixed with a triple roll, was added together with component (b), and uniformly mixed therewith. The compositions which did not contain Ep828 in component (a) were prepared as follows. First, for Example 18, the total amount of TACTIX742 and 30 parts by weight of N-740 of component (a) were dissolved with component (c) at 100° C., after which the temperature was immediately lowered to 50° C., and a mixture of 20 parts by weight of N-740 and component (d), uniformly mixed with a triple roll, was added together with component (b), and uniformly mixed therewith.

For Example 19, the total amount of Ep1032 and 30 parts by weight of N-670 were dissolved with component (c) at 100° C., after which the temperature was immediately lowered to 50° C., and a mixture of 20 parts by weight of N-740 and component (d), uniformly mixed with a triple roll, was added together with component (b), and uniformly mixed therewith.

For Example 21, the total amount of Ep1032, the total amount of XAC4152 and 20 parts by weight of Ep604 were dissolved with component (c) at 100° C., after which the temperature was immediately lowered to 50° C., and a mixture of 20 parts by weight of Ep604 and component (d), uniformly mixed with a triple roll, was added together with component (b), and uniformly mixed therewith.

The stability of each of the epoxy resin compositions of Examples 15–22 was confirmed based on the viscosity increase factor after standing at 25° C. for 3 weeks. The results are shown in Tables 5 and 6. The releasability of the primary cured products of the epoxy resin compositions and the Tg values of the secondary cured products were evaluated in the same manner as Example 14. The results are shown in Tables 5 and 6.

TABLE 5

|  |  |  | Example |  |  |  |  |
|---|---|---|---|---|---|---|---|
| No. |  |  | 14 | 15 | 16 | 17 | 18 |
| Composition | a | Ep828 | 20 | 20 | 20 | 20 |  |
|  |  | TACTIX742 | 40 | 40 |  |  | 50 |
|  |  | Ep604 | 40 | 40 | 40 | 40 |  |
|  |  | N-740 |  |  |  |  | 50 |
|  |  | Ep1032 |  |  | 40 |  |  |
|  |  | Ep157 |  |  |  | 40 |  |
|  | b | HX3722 | 25 | 10 | 10 | 10 | 10 |
|  | c | DDS | 20 | 20 | 20 | 20 | 20 |
|  | d | PDMU |  | 3 | 3 | 3 | 3 |
| Stability of resin composition (viscosity increase factor) |  |  | 1.5 | 1.4 | 1.4 | 1.4 | 1.3 |
| Releasability of primary cured product |  |  | ○ | ◉ | ◉ | ◉ | ◉ |
| Glass transition temperature of secondary cured product (° C.) |  |  | 185 | 198 | 209 | 203 | 185 |

TABLE 6

|  |  |  | Example |  |  |  |
|---|---|---|---|---|---|---|
| No. |  |  | 19 | 20 | 21 | 22 |
| Composition | a | Ep828 |  | 20 |  | 30 |
|  |  | Ep1001 |  | 20 |  | 20 |
|  |  | Ep604 |  |  | 40 |  |
|  |  | N-740 |  |  |  | 50 |
|  |  | Ep1032 | 50 | 40 | 30 |  |
|  |  | N-670 | 50 |  |  |  |
|  |  | ELM-100 |  | 20 |  |  |
|  |  | XAC4152 |  |  | 30 |  |
|  | b | HX3722 | 10 | 10 | 10 | 10 |
|  | c | DDS | 20 | 20 | 20 | 20 |
|  | d | PDMU | 3 | 3 | 3 | 3 |
| Stability of resin composition (viscosity increase factor) |  |  | 1.3 | 1.9 | 1.4 | 1.2 |
| Releasability of primary cured product |  |  | ◉ | ◉ | ◉ | ◉ |
| Glass transition temperature of secondary cured product (° C.) |  |  | 188 | 185 | 207 | 168 |

COMPARATIVE EXAMPLE 4

An epoxy resin composition was obtained comprising the components listed in the respective columns of Table 7. The addition procedure was carried out in the same manner as Example 15, except that no HX3722 was added. The releasability of the primary cured product of the epoxy resin composition was evaluated in the same manner as Example 14, but the composition did not cure in the primary curing for 2 hours at 90° C.

COMPARATIVE EXAMPLE 5

An epoxy resin composition was obtained comprising the components listed in the respective columns of Table 7. The addition procedure was carried out in the same manner as Example 15, except that no DDS was added. When the releasability of the primary cured product of the epoxy resin composition was evaluated in the same manner as Example 14, the releasability in the primary curing was found to be satisfactory. The Tg after secondary curing was also measured in the same manner as Example 14 and found to be low at 134° C.

COMPARATIVE EXAMPLE 16

An epoxy resin composition was obtained comprising the components listed in the respective columns of Table 7. The addition procedure was carried out in the same manner as Example 15, except that no HX3722 was added. Dicy was added together with PDMU to 20 parts by weight of Ep828, and a uniform mixture was obtained using a triple roll.

The releasability of the primary cured product of the epoxy resin composition was evaluated in the same manner as Example 14, but release was not possible due to insufficient curing in the primary curing for 2 hours at 90° C.

Because the Dicy used in this comparative example is an excellent latent curing agent and its active temperature can be lowered by use in combination with a urea compound, it is commonly used as an epoxy resin composition curing agent for prepregs. However, even with a Dicy/PDMU system such as used in this comparative example, the curing initiation temperature is 115° C., and it has no curing power at 100° C. or below.

TABLE 7

|  |  |  | Comp. Ex. |  |  |
|---|---|---|---|---|---|
| No. |  |  | 4 | 5 | 6 |
| Composition | a | Ep828 | 20 | 20 | 20 |
|  |  | TACTIX742 | 40 | 40 | 40 |
|  |  | Ep604 | 40 | 40 | 40 |
|  | b | HX3722 |  | 10 |  |
|  | c | DDS | 20 |  | 20 |
|  | d | PDMU | 3 | 3 | 3 |
|  | Other | Dicy |  |  | 5 |
| Releasability of primary cured product |  |  | x | ◉ | x |
| Glass transition temperature of secondary cured product (° C.) |  |  |  | 134 |  |

EXAMPLES 23–26

Epoxy resin compositions were obtained comprising the components listed in the respective columns of Table 8. As the addition procedure, for the compositions of Examples 23 and 24 which contained no additional components, 50 parts by weight of Ep1032 and 30 parts by weight of Ep604 and component (c) were dissolved at 100° C., after which the temperature was immediately lowered to 50° C., and a mixture of component (b), a curing agent as component (d) in cases where component (d) was used, and 20 parts by weight of Ep604 of component (a), uniformly mixed with a triple roll, was loaded therein and the entire composition was mixed to uniformity.

For Example 25, PES was added to 50 parts by weight of Ep1032 in component (a) and 30 parts by weight of Ep604, the PES was dissolved therein at 150° C., and then after lowering the temperature to 100° C., component (c) was added and dissolved therein and the procedure was subsequently carried out in the same manner as Example 23.

For Example 26, Aerosil 300, PDMU and 20 parts by weight of Ep604 were combined into a uniform mixture with a triple roll, and the procedure was subsequently carried out in the same manner as Example 23.

The viscosity of each of the epoxy resin compositions at 60° C., the viscosity increase factor after standing at 25° C. for 3 weeks, the flexural modulus of the primary cured product obtained by primary curing at 90° C. for 2 hours, the Tg of the secondary cured product obtained by secondary curing of the primary cured product at 200° C. for 4 hours and the elastic modulus retention (%) at 180° C. with respect to 30° C. were measured.

The glass transition temperature (° C.) Tg was determined based on the temperature distribution of G'. The elastic modulus retention (%) at 180° C. with respect to 30° C. was determined by measuring the G' value at 30° C. and the G' value at 180° C. and calculating "(G' at 180° C.)×100/(G' at 30° C.)". The results are shown in Table 8.

A hot melt method was used to impregnate each of the epoxy resin compositions into a reinforcing fiber material doubled with TR50S-12L carbon fiber by Mitsubishi Rayon Co., Ltd. in one direction, to obtain a prepreg with a fiber basis weight of 125 g/m$^2$ and a resin content of 30 wt %.

Upon evaluating the tack of the prepregs by touch, they were found to exhibit satisfactory and suitable tack. Each prepreg exhibited suitable tack even after standing at 25° C. for 20 days, and therefore the prepreg life was confirmed to be 20 days or longer.

The prepreg was used for molding of a unidirectional sheet with a 2 mm thickness by primary curing at 90° C. for 2 hours. The releasability of the primary cured product was satisfactory. The released primary cured product was subjected to secondary curing at 200° C. for 4 hours, and upon measuring the ILSS of the secondary cured CFRP panel at 150° C. according to ASTM D2344-84, it was confirmed to have excellent mechanical properties at high temperature. The results are shown in Table 8.

TABLE 8

| | | | Example | | | |
|---|---|---|---|---|---|---|
| No. | | | 23 | 24 | 25 | 26 |
| Composition | a | Ep604 | 50 | 50 | 50 | 50 |
| | | Ep1032 | 50 | 50 | 50 | 50 |
| | b | HX3722 | 25 | 10 | 10 | 10 |
| | c | DDS | 20 | 20 | 20 | 20 |
| | d | PDMU | | 3 | 3 | 3 |
| | Other | PES | | | 5 | |
| | | Aerosil 300 | | | | 5 |
| Viscosity at 60° C. (Pa · sec) | | | 210 | 520 | 980 | 540 |
| Stability of resin composition (viscosity increase factor) | | | 1.5 | 1.4 | 1.4 | 1.7 |
| Tack of prepreg | | | good | good | good | good |
| Working life of prepreg (days) | | | >20 | >20 | >20 | >20 |
| Releasability of primary cured product | | | ○ | ◉ | ◉ | ◉ |
| Flexural modulus of primary cured product (MPa) | | | 380 | 4200 | 3800 | 4800 |
| Glass transition temperature of secondary cured product (° C.) | | | 198 | 210 | 205 | 208 |
| Elastic modulus retention of secondary cured product (%) | | | 51 | 68 | 64 | 67 |
| ILSS of secondary cured product at 150° C. (MPa) | | | 48 | 55 | 57 | 61 |

COMPARATIVE EXAMPLE 7

After obtaining an epoxy resin composition comprising the components listed in the respective columns of Table 9, the epoxy resin composition was used to prepare a prepreg in the same manner as Example 23 and it was attempted to use the prepreg to mold a primary cured product in the same manner as Example 23, but the composition did not cure in the primary curing.

COMPARATIVE EXAMPLE 8

After obtaining an epoxy resin composition comprising the components listed in the respective columns of Table 9, the epoxy resin composition was used to prepare a prepreg in the same manner as Example 23, and the prepreg was used to mold primary and secondary cured products.

The T#241 used in the epoxy resin composition of this comparative example is a curing agent with curing power at 100° C. and below, but it exhibits no latent reactivity, and therefore in the latent reactivity evaluation the composition had cured after 1 day. The viscosity increase of the epoxy resin composition was rapid, reaching complete curing by 3 weeks at 25° C. The working life of the prepreg was therefore short, with complete loss of tack and an unusable state reached after 3 days.

COMPARATIVE EXAMPLE 9

After obtaining an epoxy resin composition comprising the components listed in the respective columns of Table 9, the epoxy resin composition was used to prepare a prepreg in the same manner as Example 23, and the prepreg was used to mold primary and secondary cured products.

As the epoxy resin composition of this comparative example contained no component (c), the Tg of the secondary cured composition was low, and the elastic modulus retention (%) at 180° C. with respect to 30° C. was also low. Also, the 150° C. ILSS of the CFRP obtained by secondary curing was unmeasurable and the mechanical properties were poor at high temperature.

TABLE 9

| | | | Comp. Ex. | | |
|---|---|---|---|---|---|
| No. | | | 7 | 8 | 9 |
| Composition | a | Ep604 | 50 | 50 | 50 |
| | | Ep1032 | 50 | 50 | 50 |
| | b | HX3722 | | | 10 |
| | c | DDS | 20 | 20 | |
| | d | PDMU | 3 | 3 | 3 |
| | Other | T#241 | | 80 | |
| | | Dicy | 5 | | |
| Viscosity at 60° C. (Pa · sec) | | | 1100 | 30 | 520 |
| Stability of resin composition (viscosity increase factor) | | | 1.3 | ∞ | 1.1 |
| Tack of prepreg | | | | good | good |
| Working life of prepreg (days) | | | | 2 | >20 |
| Releasability of primary cured product | | | | ◉ | ◉ |
| Flexural modulus of primary cured product (MPa) | | | no curing | 3900 | 4100 |
| Glass transition temperature of secondary cured product (° C.) | | | | 185 | 145 |
| Elastic modulus retention of secondary cured product (%) | | | | 38 | <10 |
| ILSS of secondary cured product at 150° C. (MPa) | | | | 35 | unmeasurable |

EXAMPLES 27–32

Epoxy resin compositions were obtained comprising the components listed in the respective columns of Table 10. The resin compositions were prepared by uniformly mixing all of component (a) at 100° C. or below, subsequently lowering the temperature to 60° C., adding components (b), (c) and (d) and mixing them uniformly therewith. The initial curing temperature of FXE1000 is 69° C. and the initial curing temperature of PN23 is 62° C.

The viscosity increase factors of FXE1000 and PN23, indicating the stability, are both 1.2, and both exhibit excellent latent reactivity.

The stabilities of each of the epoxy resin compositions were evaluated based on the viscosity increase factor after standing at 25° C. for 3 weeks. The results are shown in Table 10. The obtained epoxy resin compositions were subjected to primary curing at 90° C. for 2 hours, released from the die, and subjected to secondary curing at 200° C. for 4 hours. The glass transition temperatures (° C.) of the secondary cured products are shown in Table 10 along with the releasabilities of the primary cured products.

TABLE 10

| | | | Example | | | | | |
|---|---|---|---|---|---|---|---|---|
| No. | | | 27 | 28 | 29 | 30 | 31 | 32 |
| Composition | a | Ep604 | 60 | 60 | 15 | 80 | 80 | 80 |
| | | ELM100 | 40 | 40 | | | | |
| | | Ep5050 | | | 85 | | | |
| | | Ep828 | | | | 20 | 20 | 20 |
| | b | HX3722 | 10 | 10 | 10 | | | |
| | | FXE1000 | | | | 5 | 3 | |
| | | PN23 | | | | | | 5 |
| | c | DDS | 45 | | | 20 | 20 | 20 |
| | | ET300 | | 24 | 8 | | | |
| | d | PDMU | 3 | 3 | 3 | | 2 | |
| Stability of resin composition (viscosity increase factor) | | | 1.9 | 2.0 | 1.5 | 1.5 | 1.4 | 1.7 |
| Releasability of primary cured product | | | ⊚ | ⊚ | ⊚ | ⊚ | ⊚ | ⊚ |
| Glass transition temperature of secondary cured product (° C.) | | | 198 | 202 | 182 | 209 | 210 | 208 |

INDUSTRIAL APPLICABILITY

As explained in detail above, the epoxy resin compositions of the invention have excellent curability at low-temperatures of 100° C. and below, as well as excellent stability at room temperature, and give cured products with excellent heat resistance obtained by high-temperature secondary curing of low-temperature primary cured products.

The prepregs of the invention are obtained by impregnating reinforcing fiber materials with epoxy resin compositions having the aforementioned properties, and they therefore exhibit a long working life and satisfactory handleability, while curing in a short time to a die-releasable hardness by primary curing at low temperatures of 100° C. and below, and giving cured molded articles with excellent heat resistance by subsequent secondary curing at high temperature.

What is claimed is:

1. An epoxy resin composition, comprising (a) an epoxy resin;

(b) a latent curing agent with curing power at 100° C. or below; and (c) an aromatic amine-based curing agent and/or an alicyclic amine-based curing agent, wherein the mixing proportion of component (a), component (b) and component (c) is 3–40 parts by weight of component (b) and 10–40 parts by weight of component (c) to 100 parts by weight of component (a).

2. A composition according to claim 1, wherein the epoxy resin of component (a) is an epoxy resin composed mainly of a trifunctional or greater epoxy resin.

3. A composition according to claim 2, wherein the trifunctional or greater epoxy resin is an epoxy resin containing at least one selected from novolac-type epoxy resins represented by chemical formula (1) below,

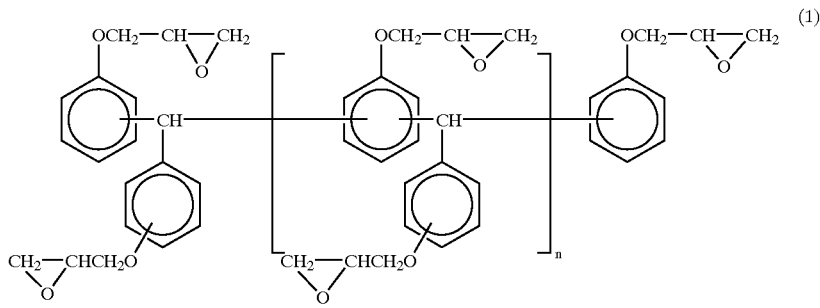

wherein n represent a number of 0 or greater: novolac-type epoxy resins represented by chemical formula (2) below,

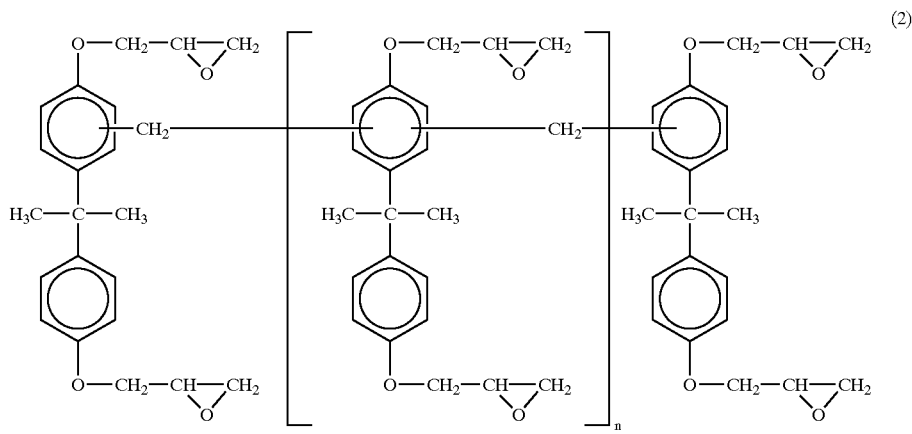

(2)

wherein n represents a number of 0 or greater; and tetralglycidyldiaminodiphenylmethane.

4. A composition according to claim 1, wherein the latent curing agent as component (b) is an amine adduct-type curing agent.

5. A composition according to claim 1, wherein the latent curing agent as component (b) is a microcapsular curing agent.

6. A composition according to claim 1, wherein the aromatic amine-based curing agent as component (c) is diaminodiphenylsulfone or diaminodiphenylmethane.

7. A composition according to claim 1, which further comprises a curing accelerator as component (d).

8. A composition according to claim 1, wherein the viscosity of the epoxy resin composition prepared and allowed to stand at 25° C. for 3 weeks is no greater than twice the viscosity immediately after preparation of the resin composition.

9. A composition according to claim 1, which either gives a cured product with a curing degree of at least 70% when obtained by primary curing for no more than 10 hours at a temperature of 100° C. or below, or gives a cured product with a tensile shear strength (adhesive strength) of at least 10 MPa according to JIS-K-6848 and JIS-K-6850.

10. A prepreg comprising a reinforcing fiber material impregnated with an epoxy resin composition according to claim 1.

11. A method of making a prepreg, the method comprising impregnating a reinforcing fiber material with an epoxy resin composition; and producing the prepreg of claim 10.

12. A method of using an epoxy resin composition to produce a fiber-reinforced composite material, the method comprising (1) impregnating a reinforcing fiber material with the epoxy resin composition of claim 1 to obtain a prepreg; and (2) subjecting the prepreg to primary curing in a molding die and, after releasing from the molding die, subjecting the primary cured molded article to secondary curing to obtain a fiber-reinforced composite material.

13. A method of making an epoxy resin composition, the method comprising mixing (a) an epoxy resin, (b) a latent curing agent with curing power at 100° C. or below and (c) an aromatic amine-based curing agent and/or an alicyclic amine-based curing agent; and producing the epoxy resin composition of claim 1.

14. A process for producing a fiber-reinforced composite material comprising the steps of:

(1) impregnating a reinforcing fiber material with an epoxy resin composition comprising (a) an epoxy resin, (b) a latent curing agent with curing power a 100° C. or below and (c) an aromatic amine-based curing agent and/or an alicyclic amine-based curing agent to obtain a prepreg; and (2) subjecting the prepreg to primary curing in a molding die and, aft r releasing from the molding die, subjecting the primary cured molded article to secondary curing to obtain a fiber-reinforced composite material.

* * * * *